(12) United States Patent
Li et al.

(10) Patent No.: US 10,505,469 B2
(45) Date of Patent: Dec. 10, 2019

(54) NONLINEAR CONTROL METHOD FOR MICRO-GRID INVERTER WITH ANTI-DISTURBANCE

(71) Applicant: Shanghai Jiao Tong University, Shanghai (CN)

(72) Inventors: Guojie Li, Shanghai (CN); Keyou Wang, Shanghai (CN); Xin Huang, Shanghai (CN); Lin Feng, Shanghai (CN); Bei Han, Shanghai (CN); Xiuchen Jiang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/216,448

(22) Filed: Dec. 11, 2018

(65) Prior Publication Data

US 2019/0288611 A1    Sep. 19, 2019

(30) Foreign Application Priority Data

Mar. 13, 2018 (CN) .......................... 2018 1 0206558

(51) Int. Cl.
*H02M 7/538* (2007.01)
*H02M 7/5387* (2007.01)
(Continued)

(52) U.S. Cl.
CPC ........... *H02M 7/53871* (2013.01); *H02J 3/01* (2013.01); *H02M 1/12* (2013.01); *H02M 1/126* (2013.01);
(Continued)

(58) Field of Classification Search
CPC ......... H02M 2001/0012; H02M 1/126; H02M 1/12; H02M 7/53871; H02M 7/53873
See application file for complete search history.

(56) References Cited

U.S. PATENT DOCUMENTS

7,084,604 B2 *   8/2006   Salomaki ................ H02P 21/13
                                                                318/767
2013/0329471 A1 *  12/2013   Escobar ................ H02M 7/487
                                                                363/40
(Continued)

*Primary Examiner* — Yusef A Ahmed
*Assistant Examiner* — Ishrat F Jamali
(74) *Attorney, Agent, or Firm* — Mei & Mark LLP; Manni Li (57) ABSTRACT

Nonlinear control method for the micro-grid inverter with anti-disturbance. By generating reference currents that satisfy specific active and reactive power command under various working conditions, and introducing a nonlinear control method based on Lyapunov function to control the inverter, fast and accurate tracking of the generated reference signals is realized. The method realizes effective decoupling control of active power and reactive power. The system has high dynamic response and good robustness. Besides, the control structure of the method is simple and easy to implement, and the synchronous control link and the additional voltage and current regulator are omitted. The method realizes fast and accurate power exchange and stable power transmission between the inverter and the grid in the micro-grid under various working conditions, and provides a guarantee for improving the energy management efficiency within the micro-grid.

7 Claims, 5 Drawing Sheets

(51) Int. Cl.
*H02P 21/13* (2006.01)
*H02J 3/01* (2006.01)
*H02M 1/12* (2006.01)
*H02P 21/00* (2016.01)
*H02M 1/26* (2006.01)
*H02J 3/00* (2006.01)
*H02M 1/00* (2006.01)

(52) U.S. Cl.
CPC ......... *H02M 1/26* (2013.01); *H02M 7/53873* (2013.01); *H02P 21/0017* (2013.01); *H02P 21/13* (2013.01); *H02J 2003/007* (2013.01); *H02M 2001/0012* (2013.01)

(56) References Cited

U.S. PATENT DOCUMENTS

2015/0002067 A1* 1/2015 Nondahl ................. H02P 21/00
                                                          318/503
2016/0329714 A1* 11/2016 Li ........................... H02M 7/44
2017/0237364 A1* 8/2017 Safamehr .......... H02M 7/53871
                                                          363/40

* cited by examiner

NONLINEAR CONTROL METHOD FOR MICRO-GRID INVERTER WITH ANTI-DISTURBANCE

CROSS-REFERENCE TO RELATED APPLICATION

The subject application claims priority on Chinese patent application CN201810206558.3 filed on Mar. 13, 2018 in China. The contents and subject matter of the Chinese priority application is incorporated herein by reference.

FIELD OF TECHNOLOGY

The present invention relates to an electronic power converter, particularly, a nonlinear control method for a micro-grid inverter with anti-disturbance.

BACKGROUND ART

The micro-grid is one of the key technologies of the smart grid that can effectively reduce the impact on the main network and users due to the dispersed location, diverse forms, and characteristics of distributed power sources, and realize effective integration and efficient utilization of distributed power sources. As a result, the micro-grid has received widespread attention in recent years. The operation of the micro-grid is flexible, as it can operate in parallel to large grid or in island.

The micro-grid contains a large amount of renewable energy, and most of the renewable energy is incorporated into the micro-grid through inverters, therefore, it is especially important to control inverters with advanced technology. When the micro-grid is in grid-connected operation state, each inverter needs to accurately transmit or receive active and reactive power according to power commands issued by the central controller of the micro-grid, and thereby meets requirements of specific power exchange between the micro-grid and large grid and improves energy management efficiency within the micro-grid.

The micro-grid of medium- and low-voltage grades, however, is often at the end of the distribution network. The voltage quality of the common connection with the distribution network is not ideal. There are often numerous background harmonics, which seriously affects the power transmission quality of the grid-connected inverters. At the same time, sag and swell of the grid voltage amplitude, frequency fluctuations, and line impedance changes cause the inverter transmission power transmitted by the inverter to fluctuate, which deviates from the preset power command, resulting in the decrease in energy transfer efficiency and even leading to negative effect on the system stability and inverter integration.

At present, the control of the transmission power of the grid-connected inverter is mainly realized by controlling the output current of the inverter. The traditional control method is mainly double-loop control. The outer loop controller generates the reference signal. The inner loop is mostly the current loop, which is related to the stability precision, harmonic content, dynamic response, and anti-disturbance ability of the inverter. According to different coordinate system selection, different control strategies are needed. For example, in the synchronous rotating coordinate system, AC variables need to be converted into DC variables, and the proportional integral controller (PI) is used to eliminate the steady-state error. However, in the non-ideal state of the grid voltage, variables obtained by the synchronous rotating coordinate system conversion is no longer DC variables, and traditional PI control is not able to meet requirements of zero steady-state error tracking. And the control in the synchronous rotating coordinate system involves phase-locking part. The performance of phase-locking part directly affects the dynamic response speed of the system and the control effect of the inverter. If the control is performed in the two-phase static coordinate system, the synchronization part required for the transformation can be eliminated, and the complexity of the control system can be reduced. The proportional integral regulator (PR) can exhibit high gain characteristics at the fundamental frequency, which can approximatively achieve error tracking for a sinusoidal quantity of a specific frequency. However, when the sinusoidal component contains other harmonic components, the resonance controller has to be incorporated at specific frequency to eliminate other harmonic components, which increases the complexity of the controller. In the control under the three-phase natural coordinate system, the three-phase system is divided into three single-phase systems for control, thus the control of each phase is relatively independent. Although it can be used for three-phase unbalanced systems, the structure of the controller is relatively complicated.

At the same time, with the in-depth study of nonlinear control theory, some nonlinear control performance characteristics such as fast dynamic response, global stability, and strong robustness, etc., to some extent, make up for the lack of linear control. In recent years, the characteristics have attracted more and more scholars' attention, and have also been applied in the control of inverters, but there are still many problems need to be solved.

SUMMARY OF THE PRESENT INVENTION

In order to overcome the deficiency of the traditional methods, the present invention provides a nonlinear control method for the micro-grid with anti-disturbance to improve the ability of the grid-connected inverter to cope with the poor power quality environment at the grid-connected point, so that each inverter is able to emit active and reactive power steadily and accurately according to the issued power command in the presence of interference conditions, thereby improving the reliability of the inverter operation and the operating efficiency of the micro-grid. The present invention provides a reasonably designed nonlinear control method for power of the LCL type grid-connected inverter with good dynamic and steady state characteristics.

To achieve the objective of the present invention, the present invention provides a nonlinear control method for the micro-grid inverter with anti-disturbance, which includes following steps:

Step 1: Collect the LCL type grid-connected inverter filter capacitor voltage $v_c$ and the grid-side inductance current $i_o$, and the mathematical model of the two parameters in the two-phase stationary coordinate system are established through coordinate transformation.

Step 2: Collect the AC bus voltage $v_g$ and the local load current $i_{load}$. After coordinate transformation, the grid-side inductance current reference signal in the two-phase stationary coordinate system is generated according to the instantaneous reactive power theory. The derivative of the reference signal is taken by the observer to obtain the first and second derivative value of the reference signal as input signal values of the nonlinear controller.

Step 3: Set an original tracking error and a filter tracking error of the control variable $i_o$ to establish a nonlinear control model of the grid-connected inverter.

Step 4: The modulated wave signal is obtained according to the LCL type grid-connected inverter mathematical model and the grid-connected inverter nonlinear control model. After coordinate transformation, the modulated wave signal in the three-phase stationary coordinate system is obtained. The grid-connected inverter is controlled by introducing a nonlinear control method based on Lyapunov function.

The mathematical model of the grid-connected inverter in a two-phase stationary coordinate system is as follows:

$$\frac{di_{o\alpha\beta}}{dt} = x_{\alpha\beta} - d; \frac{dx_{\alpha\beta}}{dt} = u_{\alpha\beta} \quad (1)$$

The method for generating the current reference signal in the two-phase stationary coordinate system according to the instantaneous reactive power theory is as follows:

$$i_{o\alpha\beta\_ref} = \begin{bmatrix} i_{o\alpha\_ref} \\ i_{o\beta\_ref} \end{bmatrix} = \begin{bmatrix} i_{load\ \alpha} \\ i_{load\ \beta} \end{bmatrix} - \frac{2}{3} \cdot \frac{1}{v_{g\alpha}^2 + v_{v\beta}^2} \begin{bmatrix} v_{g\alpha} & v_{g\beta} \\ v_{g\beta} & -v_{g\alpha} \end{bmatrix} \begin{bmatrix} P_{set} \\ Q_{set} \end{bmatrix} \quad (2)$$

The original tracking error and the filter tracking error are respectively set as follows:

$$e_{\alpha\beta} = i_{o\alpha\beta} - i_{o\alpha\beta\_ref}; E_{\alpha\beta} = ke_{\alpha\beta} + \dot{e}_{\alpha\beta} \quad (3)$$

The grid-connected inverter nonlinear control model is as follows:

$$u_{\alpha\beta}(t) = -kx_{\alpha\beta}(t) - (\lambda + k_s)E_{\alpha\beta}(t) + \quad (4)$$

$$k\dot{i}_{o\alpha\beta\_ref}(t) + \ddot{i}_{o\alpha\beta\_ref}(t) - \int_0^t \left(\lambda k_s + \frac{1}{\rho}\right)E_{\alpha\beta}(\tau)d\tau$$

where $i_{o\alpha\beta}$ represents the grid-side inductance current component in the two-phase stationary coordinate system; $x_{\alpha\beta}$ represents the state variable, d is the disturbance, including the error caused by the system disturbance and the model uncertainty; $i_{load\alpha\beta}$ represents the load current component in the two-phase stationary coordinate system; $v_{g\alpha\beta}$ represents the grid voltage component in the two-phase stationary coordinate system; $P_{set}$, $Q_{set}$ are the given active power and reactive power commands respectively; $i_{o\alpha\beta\_ref}$ is the reference current signal component; $e_{\alpha\beta}$ and $E_{\alpha\beta}$ are the set original error and filter tracking error respectively; $u_{\alpha\beta}$ represents the nonlinear control law in the two-phase stationary coordinate system, where k, λ, $k_s$, ρ are custom constants greater than zero, respectively.

The state variable is expressed as follows:

$$x_{\alpha\beta} = v_{c\alpha\beta}/\bar{L}_o \quad (5)$$

The disturbance is as follows:

$$d = \frac{1}{\bar{L}_o}(v_{g\alpha\beta} + \Delta v_{g\alpha\beta}) + \frac{i_{o\alpha\beta}}{\bar{L}_o}(R_o + \Delta R_o) + \frac{1}{\bar{L}_o}(\Delta L_o \dot{i}_{o\alpha\beta} - \Delta v_{c\alpha\beta}) \quad (6)$$

where $\bar{L}_o$ is an estimate of the sum $L_o$ of the grid-side filter inductance and the line inductance; $\Delta v_{g\alpha\beta}$ is the disturbance caused by the grid voltage; $\Delta R_o$ and $\Delta L_o$ are the deviations between the actual applied value and the theoretical value due to the uncertainty of the line parameters; $\Delta v_{c\alpha\beta}$ is the effect of the grid voltage disturbance on the capacitor voltage.

The generated modulated wave signal is as follows:

$$v_{s\alpha\beta} = \frac{1}{K_d} \cdot v_{i\alpha\beta} = \frac{1}{K_d} \cdot \left\{ \frac{d}{dt}(\bar{L}_o C \cdot u_{\alpha\beta} + i_{o\alpha\beta})\bar{L}_i + v_{c\alpha\beta} \right\} \quad (7)$$

where $v_{s\alpha\beta}$ represents the modulated wave signal component in the two-phase stationary coordinate system; $v_{i\alpha\beta}$ represents the inverter input voltage signal component in the two-phase stationary coordinate system; $K_d$ is the scaling factor and is greater than zero; $\bar{L}_i$, $\bar{C}$, $\bar{L}_o$ are estimates of the inverter-side filter inductance $L_i$, the filter capacitor C, and the sum $L_i$ of grid-side filter inductance and the line parameter; $v_{c\alpha\beta}$ represents the capacitor voltage component in the two-phase stationary coordinate system.

By reasonable value of the custom parameters in the nonlinear control model, the stability of the system is proved by the Lyapunov's direct method and the tracking error tends to zero.

Lyapunov function: $V=\frac{1}{2}E^2+\frac{1}{2}\rho r^2$ is selected and the value of its derivative $\dot{V}$ is related to custom parameters k, λ, $k_s$ and ρ. By the selection of custom parameters, the derivative $\dot{V}$ of V is less than zero. As V is a function of E and r and greater than zero, its derivative $\dot{V}$ is less than zero to ensure that V monotonically decreases until E and r tend to zero. Therefore, the global stability of the system is proved, and the tracking error tending to be zero is realized.

The disturbance d includes modeling of the uncertainty of the line impedance parameters $\Delta R_o$ and $\Delta L_o$, and ensures the power control accuracy of the designed controller when the system parameters are uncertain or the line impedance changes; the modeling of the disturbance on grid $\Delta v_g$ and the influence of grid disturbance on the capacitor voltage $\Delta v_c$ is included to ensure the control performance of the designed controller under non-ideal grid voltage conditions.

The present invention is advantageous in that:

1. It considers the interference on the LCL type grid-connected inverter caused by various factors such as poor voltage quality (more harmonics), voltage amplitude fluctuation, and frequency hopping at the grid-connected point, and the stability of the system is proved by the Lyapunov's direct method. In the present invention, the inverter is ensured to transmit or receive active and reactive power, the preset value is accurately tracked, the power fluctuation caused by the grid voltage unbalance is suppressed, and the anti-interference ability of the inverter is improved.

2. The present invention is realized in a two-phase stationary coordinate system, and the phase locking part is omitted, so that the system has better dynamic performance. When the active or reactive power command saltation occurs, the system can respond quickly, so as to achieve fast tracking of power, and ensure the transient stability of the system.

3. When the load is nonlinear, the quality of the grid-connected current is ensured, and the accurate transmission of active or reactive power is realized. Equations (4)-(5) are formulas for reference voltage. When the load is nonlinear, the load current waveform is non-sinusoidal. To ensure that the grid-connected current is a standard sine wave, the obtained reference value of the inverter output current must be non-sinusoidal. That is, $i_{o\alpha\beta\_ref} = i_{load\alpha\beta} - i_{g\alpha\beta}$. The designed controller accurately tracks arbitrary waveforms, thus ensuring the quality of the grid-connected current.

4. The present invention considers parameter uncertainties of the LCL type grid-connected inverter system. When the line impedance changes, the system has strong robustness and the accuracy of power transmission are not affected.

BRIEF DESCRIPTION OF THE DRAWINGS

FIGS. 3(a) to 3(c) show the voltage waveform and the system active/reactive waveforms when the grid-connected point is interfered according to the present invention, among which.

DETAILED DESCRIPTION OF THE PRESENT INVENTION AND EMBODIMENTS

In combination with figures, the embodiments of the present invention is further expounded.

Figure 1:
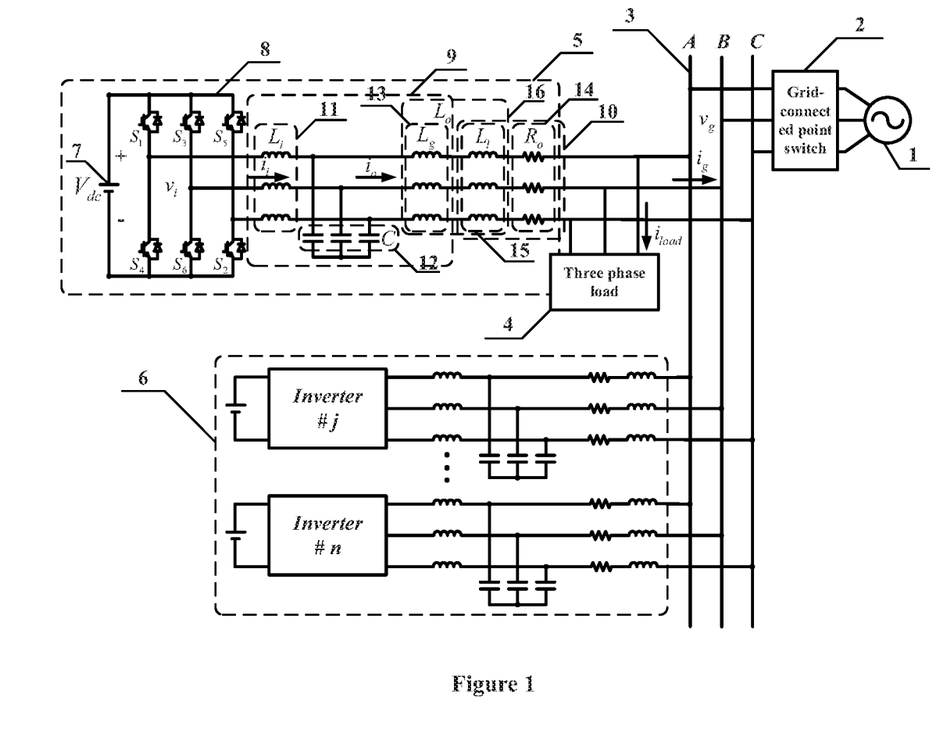
FIG. 1 is a schematic diagram of a micro-grid system including an LCL type grid-connected inverter of the present invention.

The nonlinear control method for the micro-grid inverter with anti-disturbance of the present invention is implemented on an LCL type grid-connected inverter in the micro-grid system shown in FIG. 1. The system mainly includes six parts: an external power grid 1, a grid-connected point switch 2, a three-phase AC bus 3, a three-phase load 4, a distributed electric generation element 5, and other distributed electric generation elements 6.

The distributed electric generation element 5 includes a DC voltage source 7, a three-phase voltage source full-bridge inverter 8, an LCL-type filter circuit 9, and a line impedance 10. The DC voltage source 7 uses an ideal DC voltage source, and the voltage is expressed as $V_{dc}$; the three-phase voltage source full-bridge inverter 8 includes six switch tubes $S_1 \sim S_6$; the LCL-type filter circuit 9 includes an inverter-side filter inductance $L_i$ 11, a filter capacitor C 12, and a grid-side filter inductance $L_g$ 13; the line impedance 10 includes the line resistance $R_o$ 14 and the line inductance $L_l$ 15. For the modeling's sake, the grid-side filter inductance $L_g$ and the equivalent line inductance $L_l$ are combined into $L_o$ 16. The no-load voltage of the three-phase voltage source full-bridge inverter 8 is $v_i$; the voltage of the filter capacitor 12 is $v_c$; the voltage at the grid-connected point is $v_g$, the inductance current on the inverter side is $i_i$; the inductance current on the grid side is $i_o$; the load current is $i_{load}$; the current flowing into the grid is $i_g$.

The control method of the present invention includes the following steps:

Step 1: Collect the LCL type grid-connected inverter filter capacitor voltage $v_c$ and the grid-side inductance current $i_o$, and the mathematical model of the two parameters in the two-phase stationary coordinate system are established through coordinate transformation;

First, according to FIGS. 1 and 2, the mathematical model of the system in the two-phase stationary coordinate system is expressed as follows:

$$L_i \frac{di_{i\alpha\beta}}{dt} = v_{i\alpha\beta} - v_{c\alpha\beta} \qquad (17)$$

$$L_o \frac{di_{o\alpha\beta}}{dt} = v_{c\alpha\beta} - v_{g\alpha\beta} - R_o i_{o\alpha\beta}.$$

$$C \frac{dv_{c\alpha\beta}}{dt} = i_{i\alpha\beta} - i_{o\alpha\beta}$$

Considering the uncertainty of model parameters and the interference that the system may experience, equation (17) can be expressed as follows:

$$\dot{i}_{o\alpha\beta} = \qquad (18)$$

$$\frac{v_{c\alpha\beta}}{L_o} - \frac{1}{L_o}(v_{g\alpha\beta} + R_o i_{o\alpha\beta}) - \frac{1}{L_o}(\Delta L_o \dot{i}_{o\alpha\beta} + \Delta v_{g\alpha\beta} + \Delta R_o i_{o\alpha\beta} - \Delta v_{c\alpha\beta})$$

where $\Delta L_o$, $\Delta R_o$ represents the deviation of system parameter estimation; $\Delta v_{g\alpha\beta}$ represents the disturbance caused by the grid voltage, and $\Delta v_{c\alpha\beta}$ represents the capacitor voltage disturbance caused by system parameter and grid voltage.

The disturbance is expressed as follows:

$$d_1 = \frac{1}{L_o}(v_{g\alpha\beta} + \Delta v_{g\alpha\beta}); \; d_2 = \frac{i_{o\alpha\beta}}{L_o}(R_o + \Delta R_o); \qquad (19)$$

$$d_3 = \frac{1}{L_o}(\Delta L_o \dot{i}_{o\alpha\beta} - \Delta v_{c\alpha\beta}).$$

Define state variables:

$$x_{\alpha\beta} = \frac{v_{c\alpha\beta}}{L_o},$$

the control law is expressed as:

$$u_{\alpha\beta} = \frac{1}{\overline{L_o}\overline{C}}(i_{i\alpha\beta} - i_{o\alpha\beta}),$$

where $\overline{L_o}$, $\overline{C}$ are estimates of $L_o$, $C$, respectively. Therefore, the simplified mathematical model of the grid-connected inverter is as follows:

$$\frac{di_{o\alpha\beta}}{dt} = x_{\alpha\beta} - d; \; \frac{dx_{\alpha\beta}}{dt} = u_{\alpha\beta}. \qquad (20)$$

where d is the disturbance and can be expressed as $$d = \frac{d_1 + d_2 + d_3}{3},$$

which is assumed to be unknown and finite.

Step 2: Collect the AC bus voltage $v_g$ and the local load current $i_{load}$. After coordinate transformation, the grid-side inductance current reference signal in the two-phase stationary coordinate system is generated according to the instantaneous reactive power theory. The derivative of the reference signal is taken by the observer to obtain the first and second derivative value of the reference signal as input signal values of the nonlinear controller;

The collected signals $v_g$ and $i_{load}$ are coordinate transformed to obtain $v_{g\alpha\beta}$ and $i_{load\alpha\beta}$, and the current reference value $i_{o\alpha\beta\_ref}$ of the grid-side filter inductance is obtained by the calculation formula (21) based on the instantaneous reactive power theory.

$$i_{o\alpha\beta\_ref} = \begin{bmatrix} i_{o\alpha\_ref} \\ i_{o\beta\_ref} \end{bmatrix} = \begin{bmatrix} i_{load\alpha} \\ i_{load\beta} \end{bmatrix} - \frac{2}{3} \cdot \frac{1}{v_{g\alpha}^2 + v_{g\beta}^2} \begin{bmatrix} v_{g\alpha} & v_{g\beta} \\ v_{g\beta} & -v_{g\alpha} \end{bmatrix} \begin{bmatrix} P_{set} \\ Q_{set} \end{bmatrix}. \quad (21)$$

Then, accurate estimates of the first and second derivatives of the reference signal are obtained by the observer:

$$\hat{i}_{o\alpha\beta\_ref} = k_o(i_{o\alpha\beta\_ref} - \hat{i}_{o\alpha\beta\_ref}) \quad (22),$$

where $\hat{i}_{o\alpha\beta\_ref}$ and $\hat{\dot{i}}_{o\alpha\beta\_ref}$ are the estimated values of $i_{o\alpha\beta\_ref}$ and $\dot{i}_{o\alpha\beta\_ref}$ respectively, $k_o$ is the gain of the observer, and $\hat{\ddot{i}}_{o\alpha\beta\_ref}$ is updated in real time according to $\hat{\ddot{i}}_{o\alpha\beta\_ref} = k_o(\dot{i}_{o\alpha\beta\_ref} - \hat{\dot{i}}_{o\alpha\beta\_ref})$.

Define the output error of the observer as follows:

$$e_1 = i_{o\alpha\beta\_ref} - \hat{i}_{o\alpha\beta\_ref}; e_2 = \dot{i}_{o\alpha\beta\_ref} - \hat{\dot{i}}_{o\alpha\beta\_ref} \quad (23).$$

By setting the gain of the observer $k_0$ to a large enough value, the output error of the observer can be adjusted to within the range that the system allows. In the same way, the second derivative of the current reference signal is obtained on the basis of the first derivative.

Step 3: Set the original tracking error and the filter tracking error of the control variable $i_o$ to establish a nonlinear control model of the grid-connected inverter. The original error signal and the filter tracking error signal are defined as:

$$e_{\alpha\beta} = i_{o\alpha\beta} - i_{o\alpha\beta\_ref}; E_{\alpha\beta} = k e_{\alpha\beta} + \dot{e}_{\alpha\beta} \quad (24).$$

Through the observer in step 2, the first derivative $\hat{\dot{i}}_{o\alpha\beta}$ of the grid-side filter inductance current is obtained. The filter tracking error $E_{\alpha\beta}$ is obtained as an input signal of the nonlinear controller by the formula (24), and the nonlinear control law is as follows:

$$u_{\alpha\beta}(t) = -k x_{\alpha\beta}(t) - (\lambda + k_s) E_{\alpha\beta}(t) + \quad (25)$$

$$k \dot{i}_{o\alpha\beta\_ref}(t) + \ddot{i}_{o\alpha\beta\_ref}(t) - \int_0^t \left(\lambda k_s + \frac{1}{\rho}\right) E_{\alpha\beta}(\tau) d\tau,$$

where k, λ, $k_s$, and ρ are custom constants greater than zero, respectively.

Step 4: The modulated wave signal is obtained according to the LCL type grid-connected inverter mathematical model and the grid-connected inverter nonlinear control model. After coordinate transformation, the modulated wave signal in the three-phase stationary coordinate system is obtained. The grid-connected inverter is controlled by introducing a nonlinear control method based on Lyapunov function.

According to equation (17), the modulation wave signal in the two-phase stationary coordinate system is as follows:

$$v_{s\alpha\beta} = \frac{1}{K_d} \cdot v_{i\alpha\beta} = \frac{1}{K_d} \cdot \left\{ \frac{d}{dt}(\bar{L}_o \bar{C} \cdot u_{\alpha\beta} + i_{o\alpha\beta}) \bar{L}_i + v_{c\alpha\beta} \right\}. \quad (26)$$

where $\bar{L}_i$ is the estimated value of the inverter-side filter inductance; $K_d$ is the scaling factor greater than zero.

The modulation wave signal is input into the sine wave vector modulation module to obtain pulse signals of six channels, $S_1 \sim S_6$, which are input into the three-phase voltage source full-bridge inverter circuit to control the said circuit.

Figure 2:
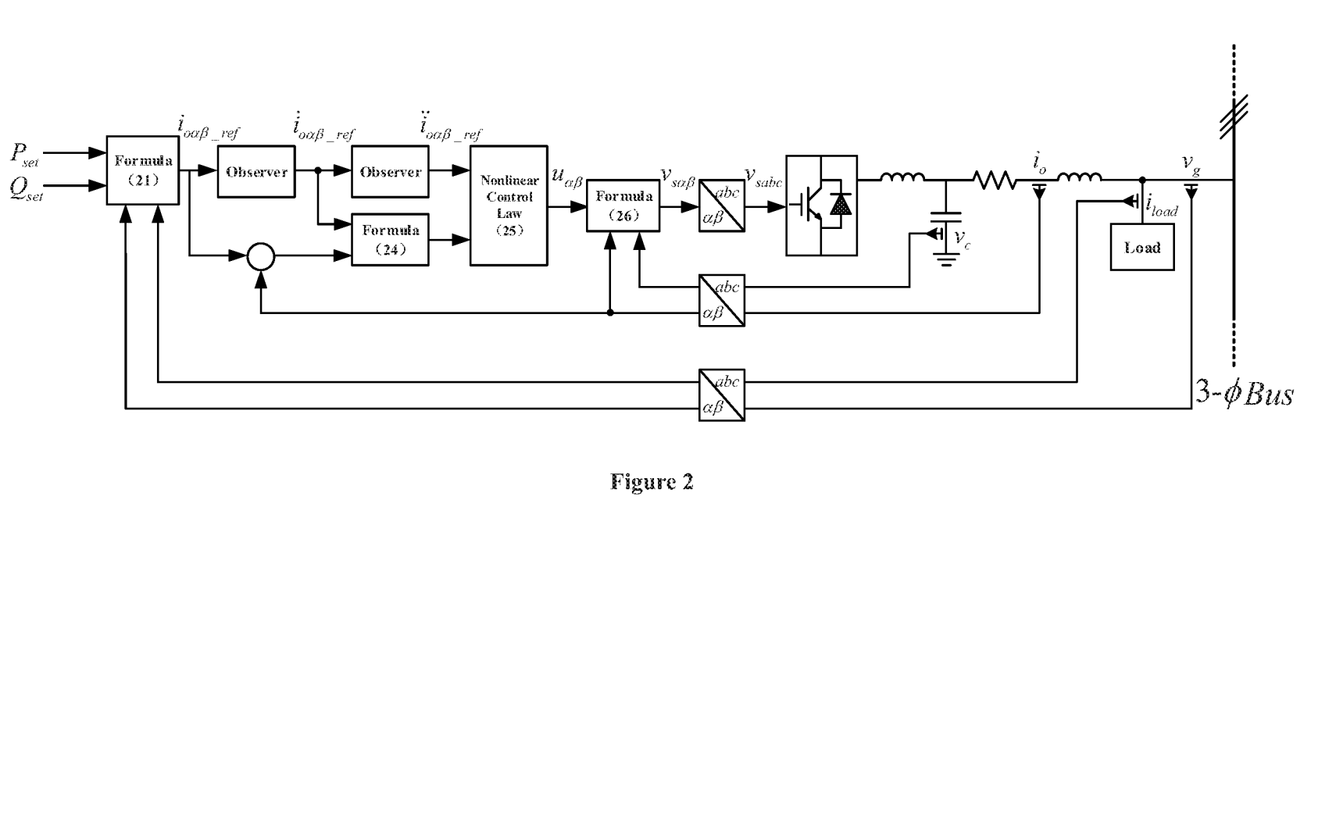
FIG. 2 is a schematic diagram showing the control method of the present invention.

In conclusion, the nonlinear power control method of the LCL type grid-connected inverter can be obtained, as shown in FIG. 2.

A simulation model of the LCL type grid-connected inverter system is built by Matlab/Simulink.

Three working conditions are simulated to test the control method of the present invention, that is, the simulated inverter is affected by the voltage disturbance (containing harmonics, voltage amplitude fluctuation, and frequency hopping) at the grid-connected point, the power preset value is changed, and the nonlinear load is connected.

Working condition 1: The grid voltage at the grid-connected point is disturbed. There are three main situations:
 1. Background harmonics are contained;
 2. Voltage amplitude fluctuation;
 3. Frequency fluctuation.

Figure 3A:
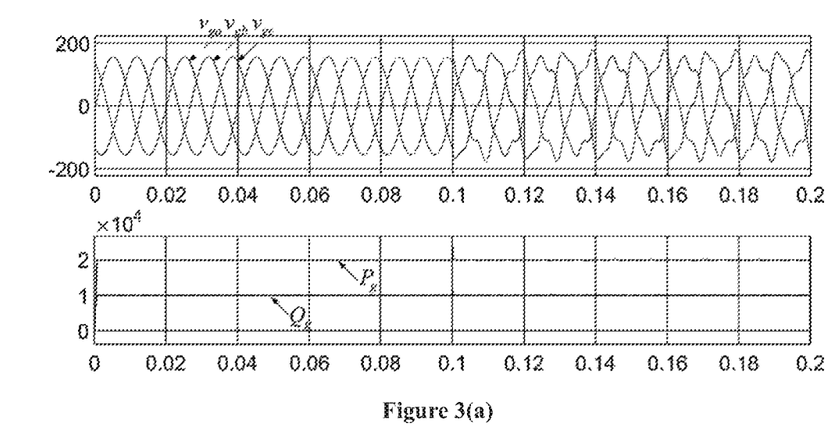
FIG. 3(a) shows the voltage waveform and the system active/reactive waveforms when harmonic is contained in the voltage of the grid-connected point.
Figure 3B:
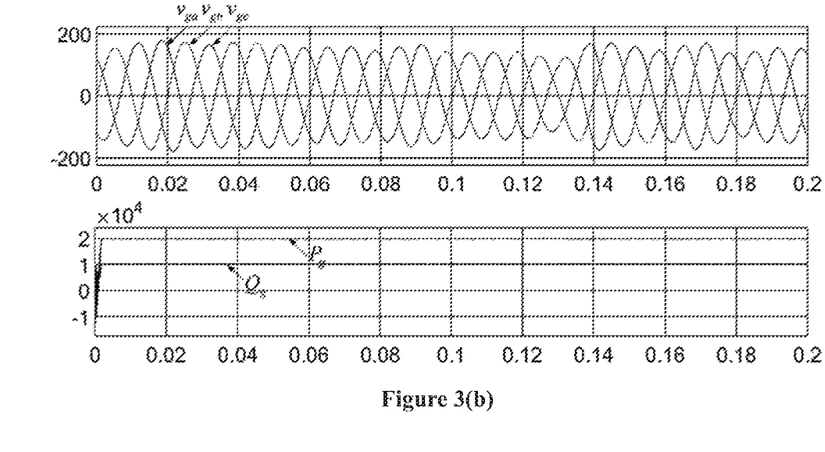
FIG. 3(b) shows the voltage waveform and the system active/reactive waveforms when voltage amplitude of the grid connection increases/decreases.
Figure 3C:
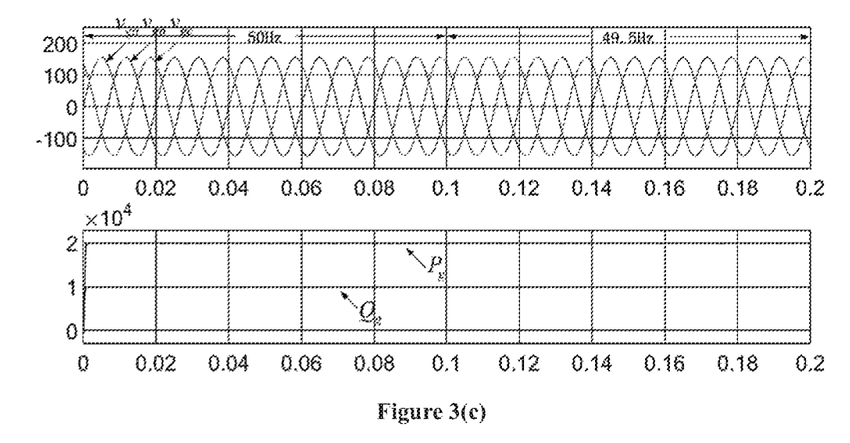
FIG. 3(c) shows the voltage waveform and the system active/reactive waveforms when frequency hopping of the grid-connected point occurs.

The power value is set to input 20 kW of active power to the grid and transmit 10 kVar of reactive power. The effects of the above three grid-side disturbances on the power input to the grid by the inverter are verified. The simulation results are shown in FIGS. 3(a) to 3(c). $v_{ga}$, $v_{gb}$, and $v_{gc}$ represent voltages of three phases at the grid-connected point abc respectively. $P_g$ and $Q_g$ represent the active and reactive power exchange between the inverter and the grid respectively. The simulation time of the system is 0.2 s. For the convenience of comparing, the voltage at the grid-connected point during 0~0.1 s is a ideal voltage waveform, and the voltage at the grid-connected point during 0.1 s~0.2 s is disturbed, which is a non-ideal voltage waveform.

Firstly, after 0.1 s, it is set that the voltage at the grid-connected point contains the third harmonic component of 15V and the fifth harmonic component of 15V, while the phase of the third harmonic component phase lags the phase of the fundamental component by 25 degrees, and the phase of the fifth harmonic component phase leads the phase of the fundamental component by 35 degrees. It can be seen from FIG. 3(a) that after 0.1 s, the active and reactive power input into the grid by the inverter can accurately track the preset power command, and the power transmission is kept stable when the voltage at the grid-connected point is distorted. No second harmonic pulsation is generated and no large fluctuation occurs at the moment when the voltage condition deteriorates.

Then, after 0.1 s, it is set that the voltage amplitude at the grid-connected point begin to fluctuate. It can also be observed that the active and reactive power input into the grid are always maintained around the preset value and remains stable at all times.

Finally, after 0.1 s, it is set that the voltage frequency at the grid-connected point jumps from 50 Hz to 49.5 Hz. It can be seen that the power transmission is not affected by the frequency change.

Working condition 2: The preset power command changes over time. In 0~0.1 s, the active and reactive power input into the grid are set to zero; in 0.1 s~0.2 s, the system transmits 10 kW of active power to the grid and receives 20 kVar of reactive power from the grid; in 0.2 s~0.3 s, the system transmits 20 kW of active power to the grid and receives 10 kVar of reactive power from the grid; in 0.3 s~0.4 s, the system transmits 10 kW of active power to the grid and receives 10 kVar of reactive power from the grid.

It can be seen from the simulation results that the system realizes decoupling control of active and reactive power, and can track power commands quickly and accurately.

Working condition 3: The system supplies power to the linear load from 0 to 0.1 s, and supplies power to the nonlinear load from 0.1 s to 0.2 s. And the power command is to transmit 20 kW of active power and 10 kVar of reactive power to the grid.

Figure 4:
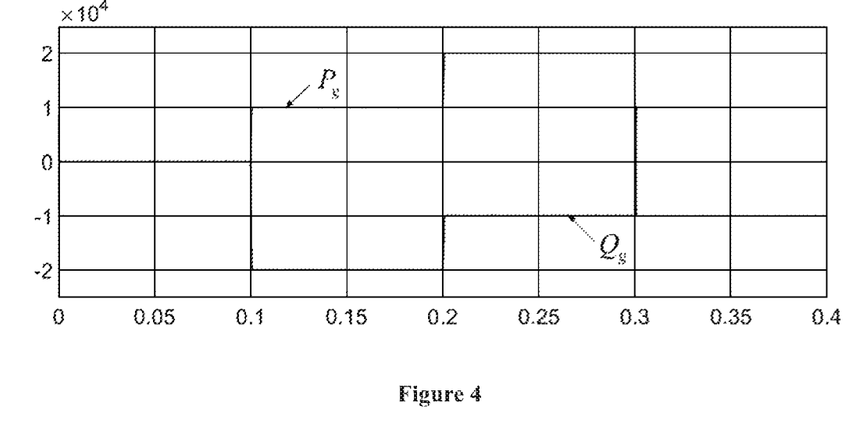
FIG. 4 shows waveforms of the system active/reactive power when the active/reactive power command changes suddenly in the present invention, indicating that the active/reactive power of the system has fast dynamic responses without any delay and transients to keep up with changes in power command.
Figure 5:
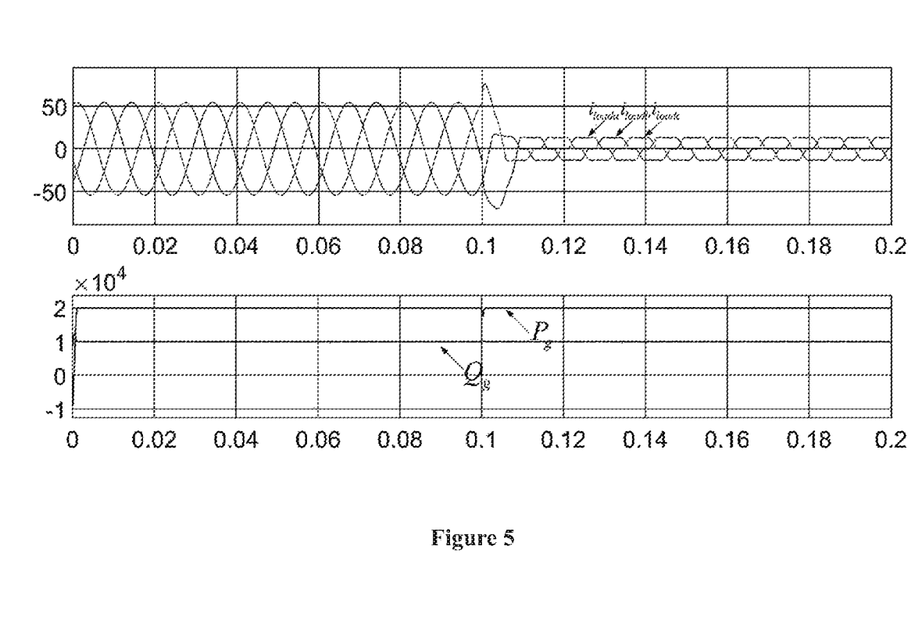
FIG. 5 shows the active/reactive power and current waveforms of the system under nonlinear loads in the present invention, indicating that the active/reactive power of the system has little affected by load changes even the loads are nonlinear.

From the waveforms of the system active/reactive power when the active/reactive power command changes suddenly in the present invention as shown in FIG. 4, the active/reactive power of the system has fast dynamic responses without any delay and transients to keep up with changes in power command. From the active/reactive power and current waveforms of the system under nonlinear loads in the present invention as shown in FIG. 5, the active/reactive power of the system has little affected by load changes even the loads are nonlinear.

It can be seen from the simulation results that at the moment when the load sudden changes, the power has received a small impact and quickly converges to the command value, and ensures the smooth and accuracy quality of power transmission to the grid when the load is nonlinear.

It can be seen that by using the said control method, the LCL type grid-connected inverter has good power transmission capability and the dynamic response of the system is rapid under conditions that the voltage point at the grid-connected is disturbed or the load is nonlinear.

We claim:
1. A method for controlling power transmission between a micro-grid system and a power grid, comprising
   providing a micro-grid system and a nonlinear controller for the micro-grid system, wherein the micro-grid system comprises a distributed electric generation element that is connected to a power grid through a grid-connected point switch, a three-phase AC bus, a three-phase AC load, and a central controller; the distributed electric generation element comprises a DC voltage source, three-phase voltage source full-bridge inverter having six switch tubes corresponding to six channels, and an LCL-type filter circuit; and the LCL-type filter circuit comprises an inverter-side filter circuit, a grid-side filter circuit, and a filter capacitor,
   collecting voltage $v_c$ of the filter capacitor and current $i_0$ of the grid-side inductance from the LCL-type filter circuit and establishing a mathematical model of a two-phase stationary coordinate system based on coordinate transformation of the voltage $v_c$ to $v_{c\alpha\beta}$ and the grid-side inductance current $i_0$ to $i_{o\alpha\beta}$ by the nonlinear controller,
   collecting voltage $v_g$ of the three-phase AC bus and local load current $i_{load}$, generating a grid-side inductance current reference signal $i_{o\alpha\beta\_ref}$ in the two-phase stationary coordinate system based on the voltage $v_g$ and local load current $i_{load}$ according to instantaneous reactive power theory, and calculating grid-connected current $i_{g\alpha\beta}$ based on the grid-side inductance current reference signal $i_{o\alpha\beta\_ref}$, active power command $P_{set}$, and reactive power command $Q_{set}$ from the central controller of the micro-grid,
   obtaining a first derivative $\dot{i}_{o\alpha\beta\_ref}(t)$ and a second derivative $\ddot{i}_{o\alpha\beta\_ref}(t)$ of the grid-side inductance reference current signal $i_{o\alpha\beta\_ref}(t)$ by an observer, and using the first derivative and the second derivative as input signal values of the nonlinear controller,
   setting an original tracking error $e_{\alpha\beta}$ and a filter tracking error $E_{\alpha\beta}$ of a control variable $i_0$, and building a grid-connected inverter nonlinear control model based on the original tracking error and the filter error by the nonlinear controller,
   obtaining a three-phase modulated wave signal according to the mathematical model of the LCL type grid-connected inverter and the grid-connected inverter nonlinear control model in a three-phase stationary coordinate system after coordinate transformation by the nonlinear controller,
   obtaining modulated pulse signals of six channels S1 to S6 from the three-phase modulated wave signal by the sine wave vector modulation module,
   inputting the modulated pulse signals of the six channels S1 to S6 and applying Lyapunov function to the three-phase voltage source full-bridge inverter, and
   transmitting power applied with the modulated pulse signals and the Lyapunov function between the three-phase voltage source full-bridge inverter of the micro-grid system and the power grid through the grid-connected point switch and maintaining stability of the power voltage therebetween.

2. The method for controlling power transmission between the micro-grid system and the power grid of claim 1, wherein the mathematical model of the two-phase stationary coordinate system based on the coordinate transformation of the voltage $v_c$ to $v_{c\alpha\beta}$ and the grid-side inductance current $i_0$ to $i_{o\alpha\beta}$ in the nonlinear controller is as follows:

$$\frac{di_{o\alpha\beta}}{dt} = x_{\alpha\beta} - d; \frac{dx_{\alpha\beta}}{dt} = u_{\alpha\beta}, \quad (17)$$

wherein $i_{o\alpha\beta}$ is the grid-side inductance current, $u_{\alpha\beta}$ is a nonlinear control law in the two-phase stationary coordinate system; $x_{\alpha\beta}$ is a state variable as follows:

$$x_{\alpha\beta} = v_{c\alpha\beta}/\overline{L}_o \quad (18),$$

d is a disturbance that comprises error caused by system disturbance and model uncertainty as follows:

$$d = \frac{1}{\overline{L}_o}(v_{g\alpha\beta} + \Delta v_{g\alpha\beta}) + \frac{i_{o\alpha\beta}}{\overline{L}_o}(R_o + \Delta R_o) + \frac{1}{\overline{L}_o}(\Delta L_o \dot{i}_{o\alpha\beta} - \Delta v_{c\alpha\beta}), \quad (19)$$

$\overline{L}_o$ is an estimate of a sum $L_o$ of the grid-side filter inductance and a line inductance, $\Delta v_{g\alpha\beta}$ is a disturbance caused by a grid voltage, $R_o$ is a value of a line resistance, $\Delta R_o$ and $\Delta L_o$ are deviations between an actual applied value and a theoretical value due to uncertainty of line parameters, respectively, $\Delta v_{c\alpha\beta}$ is an effect of the grid voltage disturbance on a capacitor voltage, $i_{load\alpha\beta}$ is a load current in the two-phase stationary coordinate system, and $v_{g\alpha\beta}$ is the grid voltage in the two-phase stationary coordinate system.

3. The method for controlling power transmission between the micro-grid system and the power grid of claim 1, wherein the grid-side inductance current reference signal $i_{o\alpha\beta\_ref}$ in the two-phase stationary coordinate system is generated according to the instantaneous reactive power theory after coordinate transformation as follows:

$$i_{o\alpha\beta\_ref} = \begin{bmatrix} i_{o\alpha\_ref} \\ i_{o\beta\_ref} \end{bmatrix} = \begin{bmatrix} i_{load\alpha} \\ i_{load\beta} \end{bmatrix} - \begin{bmatrix} i_{g\alpha} \\ i_{g\beta} \end{bmatrix}. \quad (20)$$

4. The method for controlling power transmission between the micro-grid system and the power grid of claim 3, wherein the original tracking error $e_{\alpha\beta}$ and the filter tracking error $E_{\alpha\beta}$ are set as follows:

$$e_{\alpha\beta} = i_{o\alpha\beta} - i_{o\alpha\beta\_ref}; \; E = E_{\alpha\beta} = ke_{\alpha\beta} + \dot{e}_{\alpha\beta} \quad (22),$$

wherein k is a custom constant greater than zero; $\dot{e}_{\alpha\beta}$ is a first derivative of the original tracking error $e_{\alpha\beta}$, and a tracking error is defined as $$r = r_{\alpha\beta} = \alpha E_{\alpha\beta} + \dot{E}_{\alpha\beta} \quad (23).$$

5. The method for controlling power transmission between the micro-grid system and the power grid of claim 1, wherein the grid-connected current $i_{g\alpha\beta}$ is calculated as follows:

$$i_{g\alpha\beta} = \begin{bmatrix} i_{g\alpha} \\ i_{g\beta} \end{bmatrix} = \frac{2}{3} \cdot \frac{1}{v_{g\alpha}^2 + v_{g\beta}^2} \begin{bmatrix} v_{g\alpha} & v_{g\beta} \\ v_{g\beta} & -v_{g\alpha} \end{bmatrix} \begin{bmatrix} P_{set} \\ Q_{set} \end{bmatrix}. \quad (21)$$

$P_{set}$ and $Q_{set}$ are the active power and reactive power commands from the central controller, respectively.

6. The method for controlling power transmission between the micro-grid system and the power grid of claim 1, wherein the grid-connected inverter nonlinear control model is built as follows:

$$u_{\alpha\beta}(t) = -kx_{\alpha\beta}(t) - (\lambda + k_s)E_{\alpha\beta}(t) + \quad (24)$$
$$k i_{o\alpha\beta\_ref}(t) + \dot{i}_{o\alpha\beta\_ref}(t) - \int_0^t \left(\lambda k_s + \frac{1}{\rho}\right) E_{\alpha\beta}(\tau) d\tau,$$

wherein $i_{load\alpha\beta}$ is a load current in the two-phase stationary coordinate system, and k, $\lambda$, $k_s$, $\rho$ are custom constants greater than zero, respectively.

7. The method for controlling power transmission between the micro-grid system and the power grid of claim 1, wherein the three-phase modulated wave signal $v_{s\alpha\beta}$ is obtained in the three-phase stationary coordinate system as follows:

$$v_{s\alpha\beta} = \frac{1}{K_d} \cdot v_{i\alpha\beta} = \frac{1}{K_d} \cdot \left\{ \frac{d}{dt}(\overline{L}_o \overline{C} \cdot u_{\alpha\beta} + i_{o\alpha\beta})\overline{L}_i + v_{c\alpha\beta} \right\}, \quad (25)$$

wherein $v_{i\alpha\beta}$ is an inverter input voltage in the two-phase stationary coordinate system; $K_d$ is a scaling factor that is greater than zero and a DC voltage value of an inverter side; $\overline{L}_i, \overline{C}, \overline{L}_o$ are are estimates of the inverter-side filter inductance $L_i$, the filter capacitor C, and sum $L_i$ of the grid-side filter inductance and the line parameter; $v_{c\alpha\beta}$ is capacitor voltage in the two-phase stationary coordinate system.

* * * * *